US009769273B2

(12) United States Patent
Gupta et al.

(10) Patent No.: US 9,769,273 B2
(45) Date of Patent: *Sep. 19, 2017

(54) SYSTEM AND METHOD FOR AUTOMATIC CONFIGURATION OF DOMAIN NAMES FOR THIRD PARTY SERVICES

(71) Applicant: Go Daddy Operating Company, LLC, Scottsdale, AZ (US)

(72) Inventors: Nitin Gupta, Mountain View, CA (US); Michael McLaughlin, Menlo Park, CA (US); Arnold Neil Blinn, Hunts Point, WA (US); George Kearns, Tempe, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 344 days.

This patent is subject to a terminal disclaimer.

(21) Appl. No.: 14/466,953

(22) Filed: Aug. 22, 2014

(65) Prior Publication Data
US 2016/0057243 A1  Feb. 25, 2016

(51) Int. Cl.
*G06F 15/16* (2006.01)
*H04L 29/08* (2006.01)
(Continued)

(52) U.S. Cl.
CPC .... *H04L 67/2814* (2013.01); *G06F 17/30887* (2013.01); *H04L 61/1511* (2013.01); *H04L 67/02* (2013.01); *H04L 29/0809* (2013.01); *H04L 29/08738* (2013.01); *H04L 29/1233* (2013.01); *H04L 29/12066* (2013.01); *H04L 29/12594* (2013.01); *H04L 29/12641* (2013.01);
(Continued)

(58) Field of Classification Search
CPC .......... H04L 29/08738; H04L 67/2814; H04L 29/12641; H04L 29/12066; H04L 61/1511; H04L 61/3025; H04L 29/0809; H04L 67/02; H04L 29/1233; H04L 29/12594; H04L 61/25; H04L 61/30; G06F 17/30887
USPC ................ 709/203, 217, 219, 223, 238, 244
See application file for complete search history.

(56) References Cited

U.S. PATENT DOCUMENTS 6,880,007 B1   4/2005 Gardos et al.
7,069,323 B2   6/2006 Gardos et al.
(Continued)

OTHER PUBLICATIONS

Fusu introduces Domain Stock Exchange in private beta, Oct. 17, 2007, http://www.domainnamenews.com/domain-sales/fusuintroduces-domain-stock-exchange-in-private-beta/885.
(Continued)

*Primary Examiner* — Liangche A Wang
*Assistant Examiner* — Johnny Aguiar
(74) *Attorney, Agent, or Firm* — Quarles & Brady LLP

(57) ABSTRACT

A system and method for creating custom domain name links is presented. A request is received by at least one server communicatively coupled to a network. The request is received from a user and is to create a custom domain name link to a third party service, the request identifying a custom domain name and the third party service. An entry is retrieved from a third party service link database for the third party service. The entry specifies how to create the custom domain name link for the third party service. The custom domain name link is created, by the at least one server, in accordance with the entry retrieved from the third party service link database.

5 Claims, 9 Drawing Sheets

(51) Int. Cl.
*H04L 29/12* (2006.01)
*G06F 17/30* (2006.01)

(52) U.S. Cl.
CPC .............. *H04L 61/25* (2013.01); *H04L 61/30* (2013.01); *H04L 61/3025* (2013.01)

(56) References Cited

U.S. PATENT DOCUMENTS

| | | | |
|---|---|---|---|
| 7,076,541 | B1 | 7/2006 | Burstein et al. |
| 7,472,160 | B2 | 12/2008 | King et al. |
| 2002/0010795 | A1 | 1/2002 | Brown |
| 2002/0083029 | A1* | 6/2002 | Chun .................... G06F 9/4448 706/45 |
| 2002/0091827 | A1 | 7/2002 | King et al. |
| 2002/0178383 | A1 | 11/2002 | Hrabik et al. |
| 2003/0115040 | A1* | 6/2003 | Xing .................... G06F 17/275 704/8 |
| 2004/0059793 | A1* | 3/2004 | Gruber .............. G06F 17/30887 709/217 |
| 2004/0064561 | A1 | 4/2004 | Parsons et al. |
| 2004/0083306 | A1 | 4/2004 | Gloe |
| 2004/0162895 | A1 | 8/2004 | Mok et al. |
| 2005/0144323 | A1 | 6/2005 | Gardos et al. |
| 2005/0273344 | A1 | 12/2005 | Lee et al. |
| 2007/0214284 | A1 | 9/2007 | King et al. |
| 2008/0005127 | A1 | 1/2008 | Schneider |
| 2008/0065974 | A1 | 3/2008 | Campbell |
| 2008/0114869 | A1* | 5/2008 | Thayer .................... H04L 67/02 709/223 |
| 2008/0307049 | A1* | 12/2008 | Curran .............. H04L 29/12066 709/203 |
| 2009/0132382 | A1* | 5/2009 | Mirza ................ G06Q 30/0601 705/26.1 |
| 2009/0171678 | A1 | 7/2009 | Zimmerman et al. |
| 2009/0171823 | A1 | 7/2009 | Zimmerman et al. |
| 2009/0177549 | A1 | 7/2009 | Ruiz |
| 2010/0287254 | A1 | 11/2010 | Ruiz |
| 2010/0287484 | A1 | 11/2010 | Ruiz |
| 2013/0073745 | A1* | 3/2013 | Bilinski ............ G06F 17/30887 709/246 |
| 2014/0188871 | A1 | 7/2014 | Bushlack et al. |

OTHER PUBLICATIONS

Dnxpert, Fusu Domain Stock Exchange in Beta, Oct. 17, 2007, http://www.dnxpert.com/2007/10/18/fusu-domain-stock-exchange-in-beta/.

Register.com to Issue Baltimore Digital Certificates Making e-Security Accessible to All e-Businesses, Nov. 20, 2008, Register.com, p. 1.

* cited by examiner

FIG. 7

SYSTEM AND METHOD FOR AUTOMATIC CONFIGURATION OF DOMAIN NAMES FOR THIRD PARTY SERVICES

FIELD OF THE INVENTION

The present invention relates generally to a system and method for the routing of network traffic to third party services and, more particularly, to the automated management of domain name system (DNS) records and uniform resource locator (URL) redirection records to route network traffic to the third party services.

BACKGROUND OF THE INVENTION

The Internet is a worldwide network of computers and computer networks arranged to allow the easy and robust exchange of information between users of computers. Hundreds of millions of people around the world have access to computers connected to the Internet via Internet Service Providers (ISPs). Content providers place multimedia information, i.e. text, graphics, sounds, and other forms of data, at specific locations on the Internet referred to as websites. The combination of all the websites and their corresponding web pages on the Internet is generally known as the World Wide Web (WWW) or simply web.

Websites may be created using HyperText Markup Language (HTML). The HTML tags define how the webpages for the website are to be displayed. Users of the Internet may access content providers' websites using software known as a Web browser. After the browser has located the desired webpage, the browser requests and receives information from the webserver typically in the form of an HTML document, and then displays the webpage content for the user. The user may then view other web pages at the same website or move to an entirely different website using the browser.

In most cases, browsers are able to locate specific websites because the website is hosted by a server computer having a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other, e.g. 64.202.167.32. The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon, for example 2EDC:BA98:0332:0000:CF8A:000C:2154:7313.

But IP addresses, even in a human readable notation, are difficult to remember and use by people. Uniform Resource Locators (URLs) are strings of text that are easier to remember than IP addresses and may be used to point to any website, directory or file on the Internet. A browser is able to access a website on the Internet through the use of a URL. The URL may include a Hypertext Transfer Protocol (HTTP) request combined with the website's Internet address, also known as the website's domain name. An example of a URL with an HTTP request and domain name is: http://godaddy.com. In this example, the "http" identifies the URL as an HTTP request and the "godaddy.com" is the domain name.

Individuals, companies, and other entities that provide content on the web generally want to use their name or one of their trademarks as part of their domain name. Thus, domain names are generally company trademarks, personal names or short phrases concatenated with a top level domain name (TLD) extension (e.g. .com, .net, org, .biz, .us, .cc, .ws, .de, etc.). TLD extensions can be divided into two groups. The first group is known as generic Top-Level Domains (gTLD) and the second group is country code TLDs (ccTLD).

Domain names are much easier to remember and use than their corresponding IP addresses. The Internet Corporation for Assigned Names and Numbers (ICANN) approves some gTLDs and delegates the responsibility to a particular organization (hereinafter registry) for maintaining an authoritative source for the registered domain names within a TLD and their corresponding IP addresses. For certain TLDs, e.g., .biz, .info, .name, and .org, the registry is also the authoritative source for contact information related to the domain name and is referred to as a "thick" registry. For other TLDs, e.g., .com, .net, only the domain name and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org and some other registries allows a customer to use an ICANN-accredited registrar. For example, if a customer, John Doe, wishes to register the domain name "JohnDoe.com", John Doe may initially determine whether the desired domain name is available by contacting a registrar. The customer may make this contact using the registrar's webpage and typing the desired domain name into a field on the registrar's webpage created for this purpose. Upon receiving the request from the customer, the registrar may ascertain whether "JohnDoe.com" has already been registered by checking the SRS database of the registry associated with the TLD of the domain name. The results of the search may then be displayed on the webpage to thereby notify the customer of the availability of the domain name. If the domain name is available, the customer may proceed with the registration process. Otherwise, the customer may keep selecting alternative domain names until an available domain name is found.

BRIEF DESCRIPTION OF THE DRAWINGS

FIG. 7 is a screenshot showing an example control panel for the DNS records for a domain name in which a number of records are locked.

DETAILED DESCRIPTION

Figure 1:
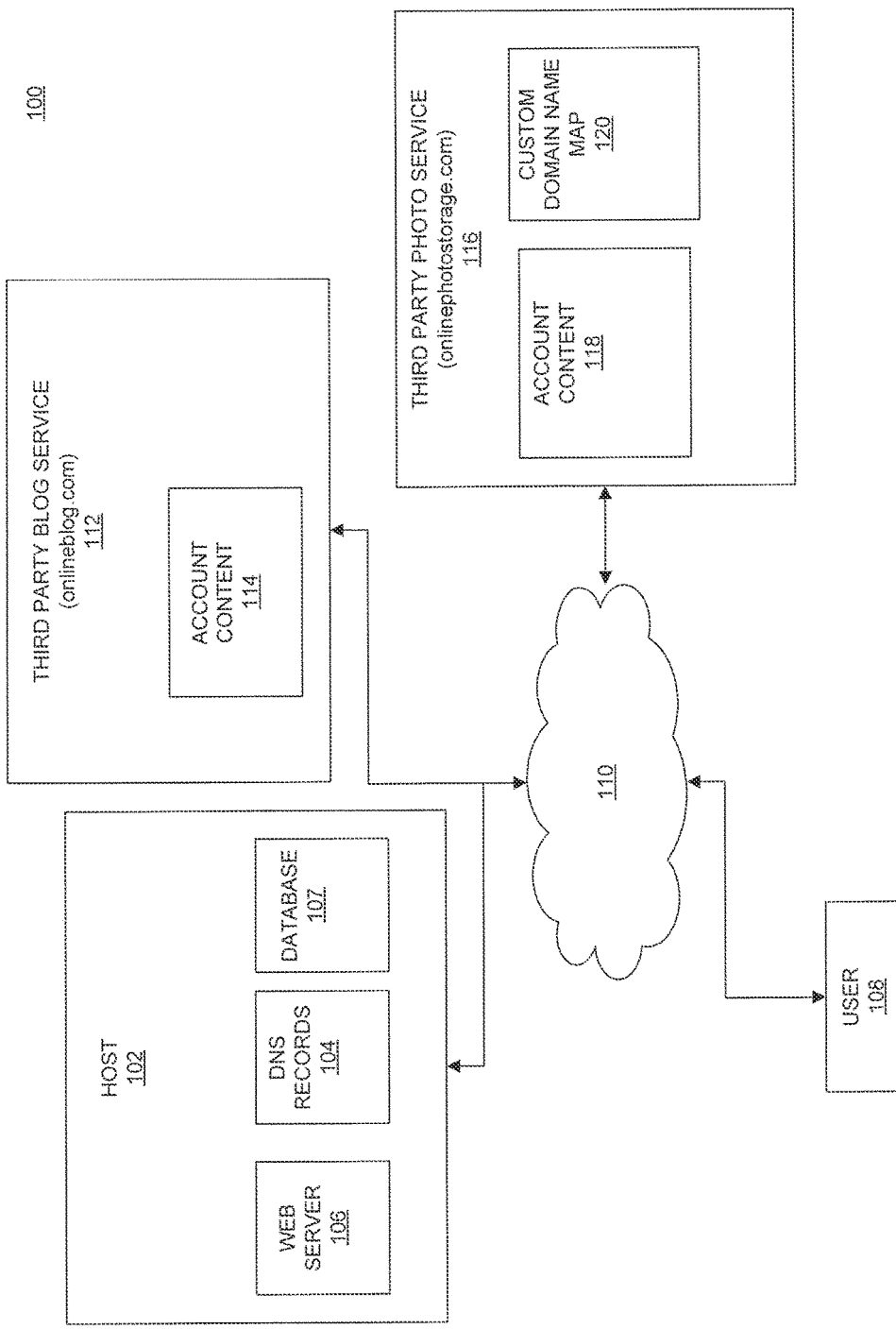
FIG. 1 is a block diagram showing an environment in which a custom domain name may be implemented.

The present invention relates generally to a system and method for the routing of network traffic to third party services and, more particularly, to the automated management of domain name system (DNS) records and uniform resource locator (URL) redirection records to route network traffic to the third party services.

In one implementation a method includes receiving, by at least one server communicatively coupled to a network, a request from a user to create a custom domain name link to a third party service. The request identifies a custom domain name and the third party service. The method includes accessing, by the at least one server, a third party service link database to identify an entry for the third party service specifying either a uniform resource locator (URL) redirect-based custom domain name link or a domain name system (DNS)-based custom domain name link, and, when the entry specifies the URL redirect-based custom domain name link for the third party service, creating, without further input from the user, a first DNS entry pointing the custom domain name to a web server accessible to the at least one server, and creating, on the web server, a URL redirect to redirect Internet traffic directed to the custom domain name to the third party service. The method includes, when the entry specifies the DNS-based custom domain name link for the third party service, creating, without further input from the user, a second DNS entry pointing the custom domain name to the third party service, and causing the third party service to create a custom domain name mapping that maps the custom domain name to a user account of the user.

In another implementation, a method includes receiving, by at least one server communicatively coupled to a network, a request from a user to create a custom domain name link to a third party service. The request identifies a custom domain name and the third party service. The method includes retrieving, by the at least one server, from a third party service link database an entry for the third party service specifying how to create the custom domain name link for the third party service, and creating, by the at least one server, the custom domain name link in accordance with the entry retrieved from the third party service link database.

In another implementation, a system includes a third party service link database storing, for each of a plurality of third party services, at least one entry specifying either a uniform resource locator (URL) redirect-based custom domain name link or a domain name system (DNS)-based custom domain name link. The system includes a processor configured to perform the steps of receiving, by at least one server communicatively coupled to a network, a request from a user to create a custom domain name link to a third party service, the request identifying a custom domain name and the third party service, accessing, by the at least one server, the third party service link database to identify an entry for the third party service, when the entry specifies the URL redirect-based custom domain name link for the third party service, creating, without further input from the user, a first DNS entry pointing the custom domain name to a web server accessible to the at least one server, and creating, on the web server, a URL redirect to redirect Internet traffic directed to the custom domain name to the third party service, and, when the entry specifies the DNS-based custom domain name link for the third party service, creating, without further input from the user, a second DNS entry pointing the custom domain name to the third party service, and causing the third party service to create a custom domain name mapping that maps the custom domain name to a user account of the user.

Once registered, a domain name can be used to reference a number of different services via the Internet or other network. This allows a single domain name (or collection of sub-domains) to provide shortcuts or simple references to a number of different online services that may otherwise be accessed using entirely different domain names. A single user, for example, having registered the domain name 'example.com' could use that single domain to receive email for the domain name 'example.com' even if their email service hosts email for multiple domains. Similarly, the user may point their domain name (or sub-domains) to other online services, such as a blog service, a photo sharing service, or an online banking service.

This arrangement both reduces the number of domains that must be remembered and recalled by the user and also enables the user's domain name to operate as a vanity or custom domain name. It allows the domain name to be used to reference services hosted by many different companies for many different purposes. For example, a user can use a custom domain name associated with their company to access (and allow customers to access) content on third party services. If the business has a primary website (e.g., at 'www.company.com'), but uses third party services to provide some of the content on the website, such as a blog, a custom domain name (e.g., 'blog.company.com') may be utilized so that when a visitor accesses the company's blog content, they do so using the custom domain name, rather than the domain name of the entity hosting the blogging software.

This provides consistent branding by ensuring that the company's domain name is used through the company's website, even when customers are, in fact, interacting with those third party services.

A first technique for implementing custom domain names for online services involves creating DNS records that point the custom domain name directly to the desired third party service. This may involve creating an A record for the custom domain name that points directly to an IP address of the third party service or a CNAME record that points the custom domain name to the domain name of the third party service. The table below illustrates an example of an A record and a CNAME record for implementing a custom domain via DNS entries.

TABLE 1

| Name | Type | Value |
| --- | --- | --- |
| photos.example.com | A | 192.168.0.1 |
| blog.example.com | CNAME | custom.free-blog.com |

In the example DNS entries depicted in Table 1, two custom domain name entries have been created. The first links the custom domain name 'photos.example.com' directly to an IP address—in this example, this would be the IP address of a third party photo sharing site. The second entry links the custom domain name 'blog.example.com' directly to the domain 'custom.free-blog.com', which provides a blogging service. When a visitor visits one of the custom domain names, these DNS records ensure that the visitor's web traffic is directed to the correct third party service. In the case of configuring email services, a number of DNS records may be created that control how emails are routed to an email service provider. In configuring email, example DNS records may include, for example, MX records, which identify the host name of the email service host, as well as particular TXT records configured to enhance the security of email services.

A second mechanism for implementing custom domain names includes the use of 301 and 302 URL redirects. URL redirection involves configuring a web server hosting a domain name to automatically redirect a request that is issued to the custom domain name to a predetermined URL. Generally, URL redirection can be of two varieties, 301 redirects or 302 redirects. A 301 redirect indicates that the redirection is permanent and causes the user's browser, or other software receiving the redirection instruction, to permanently update its own records to indicate that the custom domain name will always point to the target URL identified by the 301 redirect message. Conversely a 302 redirect provides the same functionality, but indicates that the redirection is only temporary. As such, the browser or other software would not permanently update its records in response to a 302 redirect message received from a web server.

FIG. 1 is a block diagram showing environment 100 in which a custom domain name may be implemented. Environment 100 includes a host 102. Host 102 may include a registrar providing services enabling users to register domain names, as well as a number of other services. For example, Host 102 also stores a plurality of DNS records 104 and operates as a DNS server or host. Host 102 may also provide web hosting services and, as such, includes web server 106.

User 108 communicates with host 102 via communications network 110 (e.g., the Internet). In general, user 108 communicates with host 102 using a computer and suitably configured software, such as a web browser. User 108 may communicate with host 102 to access the domain name registry services provided by the host 102. Using those services, user 108 can search for and register a desired domain name. Once registered, user 108 can configure DNS settings for the domain name by changing one or more records within DNS records 104. User 108 may also elect to setup a web page to be hosted at the domain name by web server 106 for the domain name.

User 108 may also communicate with one or more third party service providers via network 110. In the example depicted in FIG. 1, third party blog service 112 allows user 108 to create an account and host blog content with the third party blog service 112. In this example, third party blog service 112 hosts its content at the domain name 'onlineblog.com'. Blog service 112 may allow the user 108 to create and post new content to a blog, or edit content that has already been created. Once submitted, the content is stored in account content 114 data store (e.g., a database) and can be accessed by visitors to the blog via a suitable URL. In the present example, the blog account content 114 of user 108 stored on the third party blog service 112 is accessed via the URL http://onlineblog.com/users/accounts/user123.

Third party photo service 116 allows user 108 to create an account and store photos, images, or other multimedia with the third party photo service 116. In this example, third party photo service 116 hosts its content at the domain name 'onlinephotostorage.com'. Third party photo service 116 enables the user to upload and edit photographs and other media for redistribution via network 110. Once uploaded, images are stored within account content 118. The uploaded images can then be accessed over the network 110 using a suitable URL. In the present example, the photo content of the user 108 can be accessed via the URL http://onlinephotostorage.com/users/accounts/example/user123.

In this example, user 108 would like to access account content 114 (containing blog entries) and account content 118 (containing photo content) using sub-domains of the domain name 'mydomain.com', which has been previously registered with host 102. To do so, user 108 must configure one of the techniques described above (e.g., creating new DNS records or URL redirection) for implementing a custom domain name. This may not be a simple process as different third party services may only allow the use of one technique or another.

In this example, third party blog service 112 only allows the use of URL redirects when implementing a custom domain name. As such, user 108 must utilize either a 301 or a 302 redirect to point the custom domain name 'blog.mydomain.com' to third party blog service 112.

This first requires that user 108 create an entry in DNS records 104 so that the domain 'blog.mydomain.com' points to a web server under the control of user 108. In this example, user 108 is able to modify the configuration of web server 106 provided by host 102. Accordingly, an entry is created in DNS records 104 pointing 'blog.mydomain.com' to web server 106.

User 108 then configures web server 106 so that, in response to a request for the domain name 'blog.mydomain.com', web server 106 returns a 301 (or, alternatively, 302) redirect message pointing to the URL 'http://onlineblog.com/users/accounts/exampleuser', which contains account content 114.

With both DNS records 104 updated and the 301 redirect created, the custom domain name can be used as follows.

In a first step, user 108 (or any other visitor wishing to view the blog of user 108) enters the custom domain name 'blog.mydomain.com' into a browser. The browser will then retrieve the DNS records associated with the domain name 'mydomain.com' to identify the host for the domain name 'blog.mydomain.com.' In this example, those records point to web server 106.

Having retrieved the DNS records, the browser will then transmit a GET request to web server 106 in an attempt to retrieve content associated with the domain name 'blog.mydomain.com.' Web server 106 receives the request, which identifies the domain name 'blog.mydomain.com', and returns the content associated with that domain name to the user's browser. In this case, that content includes the 301 redirect instruction. An example of such an instruction is presented below:

HTTP/1.1 301 Moved Permanently
Location: http://onlineblog.com/users/accounts/exampleuser Having received the 301 redirect message, the browser of user 108 will communicate with third party blog service 112 to retrieve account content 114 stored at the URL 'http://onlineblog.com/users/accounts/exampleuser.'

This, therefore, enables user 108 or any other visitor to simply enter the custom domain 'blog.mydomain.com' into a web browser to access and receive content from third party blog service 112.

In contrast to the blog service 112, third party photo service 116 allows for the use of DNS records to implement custom domains. In this example, user 108 would like to use the custom domain 'photos.mydomain.com' to access account content 118 stored with third party photo service 116.

This first step requires that user 108 create an entry in DNS records 104 that points the custom domain 'photos.mydomain.com' to the third party photo service 116. This may involve, for example, the creation of an A record that points to the IP address of the photo service 116 or the creation of a CNAME record that points to a domain name of the photo service 116. With the necessary entry in place in DNS records 104, network traffic directed to the domain name 'photos.mydomain.com' will automatically be routed to photo service 116.

Accordingly, if user 108 enters the domain name 'photos.mydomain.com' into a browser, the browser will retrieve the DNS entry corresponding to the domain and transmit a GET request to the photo service 116. The GET request includes a 'Host:' line that contains the domain name 'photos.mydomain.com.' At this point, however, the photo service 116 would ordinarily respond to the GET request by transmit a default web page in response (i.e., a web page that does not contain account content 118 of user 108). Accordingly, user 108 must also configure photo service 116 in order to associate the domain name 'photos.mydomain.com' with account content 118 of user 108.

To do this, user 108 accesses a user account control panel to inform the photo service 116 that the custom domain name 'photos.mydomain.com' should be associated with the user account of user 108. Photo service 116 then stores that association in custom domain name map 120. In this example, because the account content 118 of user 108 is stored at the URL 'http://onlinephotostorage.com/users/accounts/example/user', the custom domain name map 120 may include a table, such as Table 2 shown below, to store the mapping of custom domain name to user account.

TABLE 2

| Custom Domain Name | User Account Name | Account Content URL |
|---|---|---|
| photos.mydomain.com | user123 | http://onlinephotostorage.com/users/accounts/example/user |

With this mapping in place, when photo service 116 receives the GET request, photo service 116 can analyze the GET request to identify the custom domain name contained in the request's 'Host:' line. Once the custom domain name is identified (i.e., 'photos.mydomain.com'), photo service 116 can consult the records stored in custom domain name map 120 to map the custom domain name to a particular user account. The account content 118 associated with that user account can then be retrieved and transmitted back in response to the request.

It is important to note that using the custom domain name approaches described above, not only can user 108 utilize the custom domain names to access the account content with both blog service 112 and photo service 116, but anybody with access to DNS records 104 and both blog service 112 and photo service 116 can also use the custom domain names to access content.

The present system and method provides a domain name control panel that enables a user to automatically configure a number of custom domain names to point to a number of third party services. The custom domain names can be setup and configured automatically so that when a user indicates that a particular custom domain name should be linked to a particular third party service, the link can be created with a minimal amount of input from the user and/or work on the user's behalf. Accordingly, the present system can be configured to automatically create DNS entries, 301 or 302 URL redirects, and custom domain name maps with third party services to create the desired custom domain name link.

Figure 2:
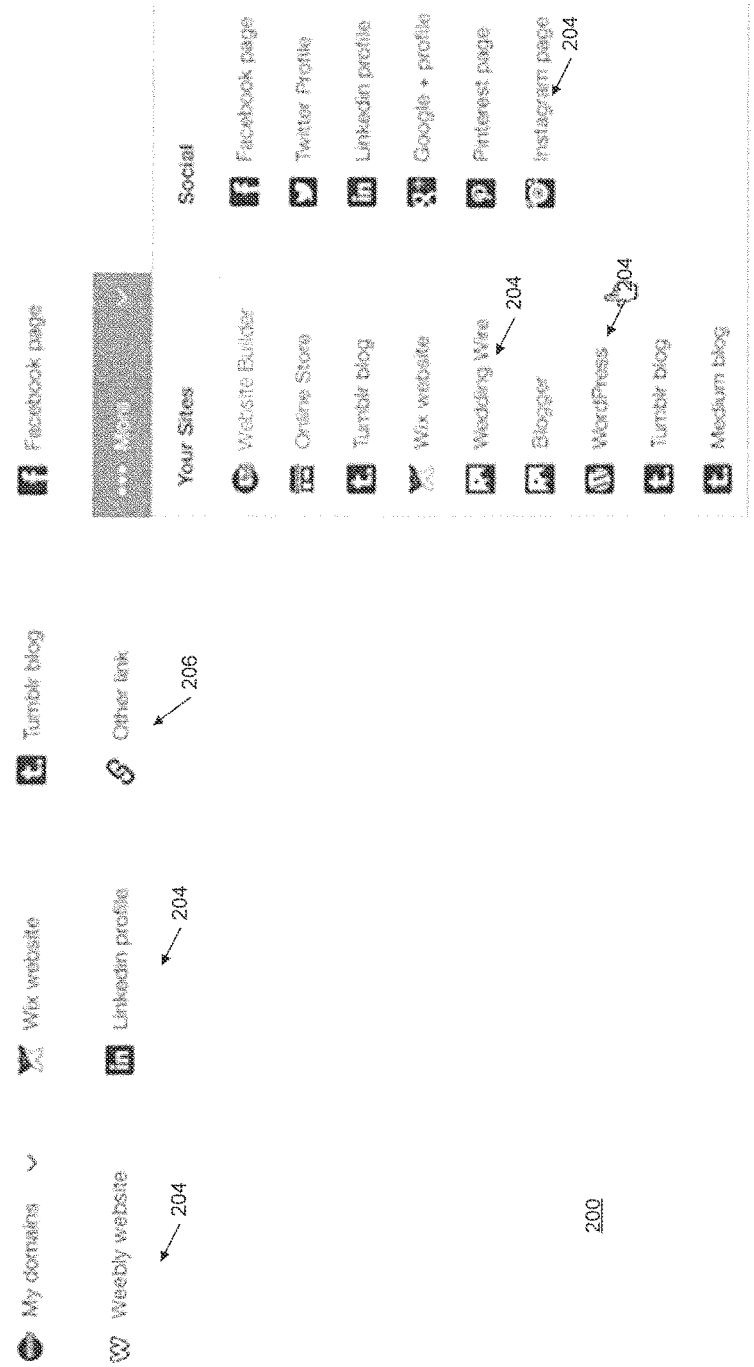
FIG. 2 is a screenshot showing an example user interface enabling a user to create a number of custom domain name links to third party services in accordance with the present disclosure.

FIG. 2 is a screenshot showing an example user interface 200 enabling a user to create a number of custom domain name links to third party services in accordance with the present disclosure. The example presented by user interface 200 allows a user to create a number of custom domain name links for the domain name 'photoprocessing.com'.

To access user interface 200 a user provides authentication credentials (e.g., user name and password) to a registrar with whom the user has registered one or more domain names. After authenticating, the user can access a control panel to control one or more settings associated with those registered domain names. In this example, the user has selected the domain name 'photoprocessing.com' and indicated that the user wishes to create custom domain names linking to third party services.

User interface 200 identifies the domain name 202 currently selected and for which custom domain name links can be created. User interface 200 also provides a number of buttons 204 that can be selected by the user to initiate the process of creating a third party custom domain link. Each button 204 is associated with a different third party service and provides a simple mechanism by which the user can point a custom domain name (e.g., a sub-domain of the domain name 'photoprocessing.com' or the domain 'photoprocessing.com' itself) to the third party service.

Depending upon the implementation, buttons 204 may include clickable text or logos that are associated with the third party service. In some cases, however, buttons 204 may include screen shots showing an example web page from the third party service. In this manner, even if the user is unaware of the name of a particular third party service, the user may recognize the screen shot and elect to create a custom domain name link thereto.

In some implementations, the registrar will have access to information associated with the user that allows for a more intelligent selection and depiction of the various buttons 204 enabling links to third parties. For example, the user's account information stored by the registrar may indicate where the user is located. In that case, the buttons 204 can be arranged so that third party services that are prominent nearby the user can be displayed in a more prominent position, while third party services that are less prominent can be demoted within user interface 200.

In another example, the user's account information may identify a business or entity type or category for the user. For example, the user's account may be affiliated with a business. In that case, the user's account may indicate the type of business (e.g., bakery, bike shop, law firm, and the like). With the business type identified, the buttons 204 can be arranged so that third party services that are more relevant to the business type are display in a prominent position, while less relevant third party services are demoted.

For example, if the user is affiliated with a bakery or restaurant, the button 204 that allows the user to create a custom domain name for a YELP account may be made more prominent. Conversely, if the user is affiliated with a photography service, a button 204 enabling the user to link to a photo sharing site (e.g., FLICKR) may be made more prominent. Similarly, if the user is unaffiliated with a business, buttons 204 associated with third party services that are more relevant to personal web sites may be given more prominence (e.g., PINTEREST and WEDDING WIRE).

In other embodiments, buttons 204 may be prioritized to make some buttons 204 more prominent based upon other factors or variables, such as the prior purchases or product usage history of the user or the user's prior use of some third party services. In some cases, third parties may compensate host 102 for displaying some buttons 204 in more prominent positions that others.

In this disclosure, a more prominent placement location for a button 204 may comprise any location in the listing of buttons 204 depicted within user interface 200 that may be more likely to attract the attention of a user using user interface 200 than another location. The prominent placement location, as non-limiting examples, may be determined by human factors, usability, or similar studies, or may be a simple arbitrary or intuitive choice. As illustrated by user interface 200, it also may comprise a preferred placement of a button 204 within a vertical arrangement of a plurality of buttons 204, perhaps at the top of a list of buttons 204, or simply a higher placement within such a list than the placement of other buttons 204. The preferred placement may therefore, as non-limiting examples, comprise a topmost, bottom-most, or more centered position in any such vertical list.

In some embodiments, user interface 200 may include one or more buttons 204 or other user interface mechanisms enabling the user to create custom domain name links between domain name that are registered to the user. For example, if the user has registered the domain names companyname.com and companyname.co, one or more buttons 204 may be included in user interface 200 enabling the user to forward the .co domain name to the .com domain name (assuming that the .com domain name is already tied to accessible user content). Additionally, one or more buttons 204 may be made available allowing the user to point companyname.blog to a specific URL, such as companyname.com/blog, if content is detected at that URL.

To enable the operation of user interface 200, host 102 stores, for each third party service that may be linked to (e.g., for each button 204), information describing how such link is to be created in a third party service link database. This may involve, for each third party service provider, storing data indicating whether the third party service allows DNS-based custom domain names, or relies on 301 or 302 redirects. The data will further include, for each technique of creating a custom domain name link, the specific details of how such a custom domain name link is to be created. For example, the data may include a listing of DNS records that must be created to enable the custom domain name link to operate. The data may also include a listing or description of user-specific data that must be retrieved from the third party service provider and inserted into a DNS record before the custom domain name link will function correctly.

For services that support DNS-based custom domain names, host 102 may store the following information depicted in Table 3 in the third party service link database.

TABLE 3

| Data | Description |
| --- | --- |
| Name | The name of the third party service |
| Mobile? | Indicates whether the third party service is hosting website content formatted for display on a mobile device - yes/no value. |

TABLE 3-continued

| Data | Description |
| --- | --- |
| DNS templates (type and value) | Defines a number of templates for DNS records that must be created to implement the custom domain name link. The DNS record templates may be static entries that specify a name, type (e.g., A or CNAME) and value (e.g., a known IP address or domain name). The templates may include variables that must be replaced by user-specific tokens. |
| Region | Indicates a geographical region for the third party service |
| Authentication Mechanism | Specifies an authentication mechanism that the host 100 can use to access the third party service to create and modify custom domain name map records stored with the third party service as well as retrieve user-specific tokens from the third party service(e.g., OAuth) |
| Default? | Indicates whether this entry is the default entry for the third party service |

For services that support 301 or 302 URL redirects for custom domain names, host 102 may store the following information depicted in Table 4 in the third party service link database.

TABLE 4

| Data | Description |
| --- | --- |
| Name | The name of the third party service |
| Mobile? | Indicates whether the third party service is hosting website content formatted for display on a mobile device - yes/no value. |
| URL Redirect template | Stores a template for the URL that will be entered into the URL redirect - may include variables that are filled in at the time of creation with information provided by the user (e.g., https://www.service.com/users/accounts/home/[accountname]) |
| Token(s) | Identifies each of the tokens we need from the user in order to be able to create the URL redirect (e.g., account name, account nickname, account number, etc.) |
| 301 or 302 URL redirect? | Indicates whether the redirect should be implemented as a 301 or 302 redirect |
| Region | Indicates a geographical region for the third party service |
| Default? | Indicates whether this entry is the default entry for the third party service |

For services that provide email services, host 102 may additionally store MX records and sender policy framework (SPF) details for the service in the third party service link database.

The third party service link database (e.g., the records described above and in Table 3 and Table 4) may be stored by host 102 in any suitable storage location and format. For example, the records may be stored in a database, such as a relational database (e.g., PostgreSQL, ORACLE database, MICROSOFT SQL SERVER) configured to store the third party service link database accessible to host 102. The database may be local to (e.g., running on) host 102, or may be hosted by a server computer remote to host 102 and accessible using network 110. The third party service link database may be stored, for example, in one or more tables of a relational database (e.g., database 107 of FIG. 1). Alternatively, the records may be stored in tables or text files on any suitable data storage device accessible to host 102. In various embodiments, the records may store additional information such as an "Activation Rate" which indicates how many users are setting up that type of custom domain name. The records may also store a cost value, should a monetary fee or cost be associated with a particular type of custom domain name.

Returning to FIG. 2, to create a custom domain name for a third party service, the user first selects one of buttons 204 on user interface 200 provided by host 102. After the user selects one of buttons 204, indicating that the user wishes to create a custom domain name for the third party service associated with that button 204, host 102 identifies the third party service associated with the button 204 selected by the user.

Figure 3:
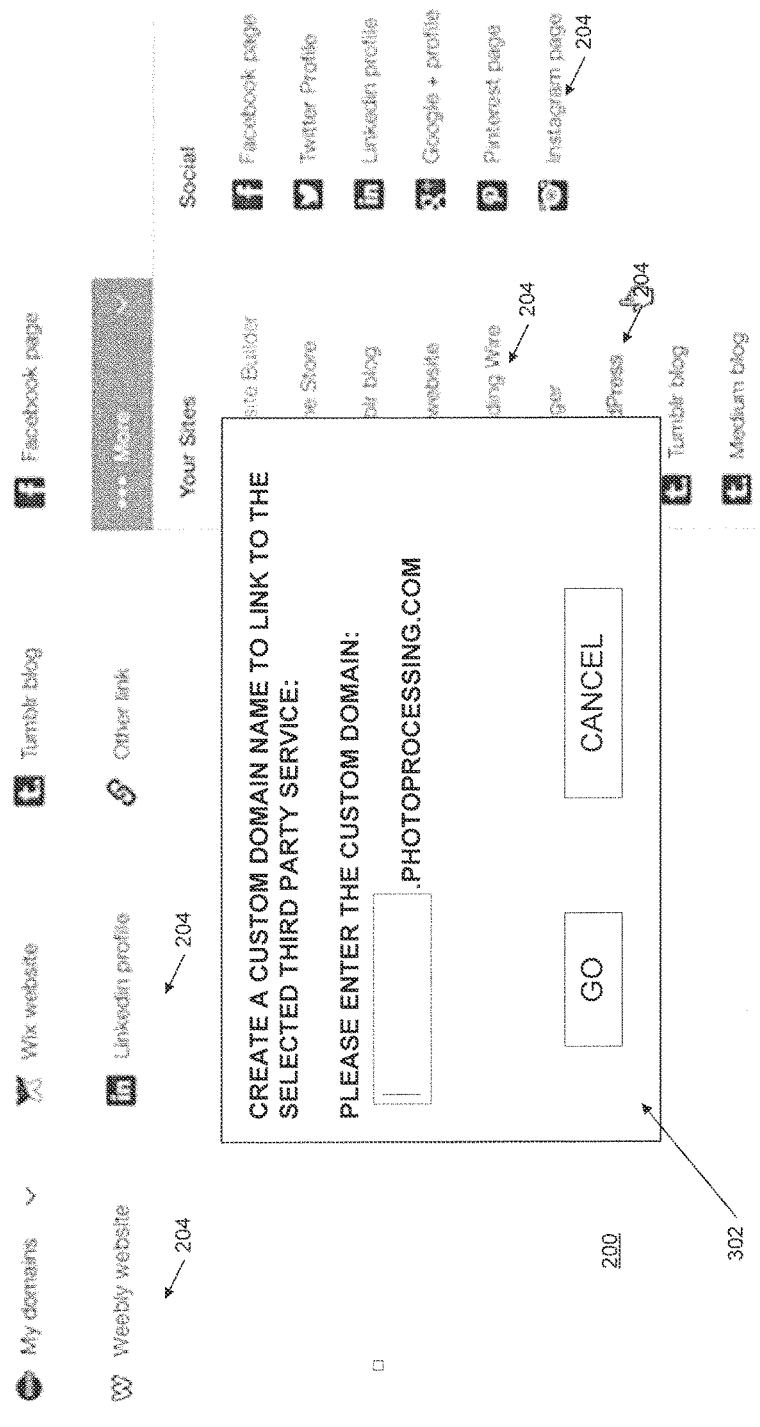
FIG. 3 is a screen shot of the user interface of FIG. 2 after the user has selected a button to create a custom domain name for a third party service.

With the third party service selected and identified, host 102 then prompts the user to enter a custom domain name to be linked to the selected third party service. The custom domain name, for example, may be a sub-domain of the domain name for which settings are currently being modified (e.g., photoprocessing.com in FIG. 2) or the domain name itself. Accordingly, the custom domain name may be a second level domain name (SLD), n-level domain (nLD), or any other form of domain name. FIG. 3, for example, shows a screen shot of user interface 200 after the user has selected one of buttons 204 to create a custom domain name for a third party service. As illustrated, the user is prompt with form 302 to supply the desired custom domain name to be linked to the selected third party service. Although the example depicted in FIG. 3 shows the user being able to enter a sub-domain to the domain name 'photoprocessing.com' as the custom domain name, the user may instead elect to the use the domain name 'photoprocessing.com' for the custom domain name.

After the user enters the custom domain name (in this example, 'blog.photoprocessing.com'), the host 102 looks up the selected third party service in the third party service link database to determine whether the selected third party service allows DNS-based custom domain names. If the selected third party service allows DNS-based custom domain names, the host 102 may perform the method illustrated in FIG. 4 to create the user's desired custom domain name.

Figure 4:
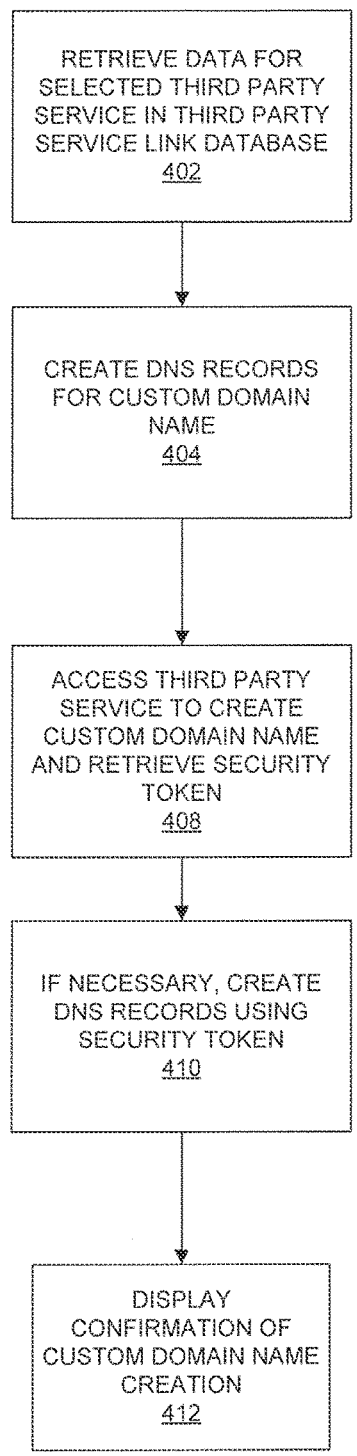
FIG. 4 is a flowchart depicting a method for creating a DNS-based custom domain name for a third party service.

Referring to FIG. 4, in step 402 host 102 accesses the third party service link database to retrieve the entry for the selected third party service. In some cases, where there are multiple entries for the selected third party service, this will involve selecting the entry that is associated with a location that matches that of the user. In this optional step, the location of the user may be identified, for example, by examining the customer records of the user (e.g., to identify a mailing address or residence address for the user), or analyzing an IP address of the user to determine a location of the user's computer. Then, the entry for the selected third party service with a region that encompasses that of the user can be retrieved. In the event that no entry includes a region that encompasses the user, one of the entries for the selected third party service may be defined as a default entry to be utilized.

In some cases, the custom domain name provided by the user will at least partially determine which entry is retrieved for the selected third party service. For example, if the custom domain name entered by the user is 'mobile.photoprocessing.com' or 'm.photoprocessing.com', the use of the terms 'mobile' or 'm' may indicate that the user wishes to use the custom domain name to display content suited for display on a mobile device. In that case, host 102 would retrieve the entry for the third party service that is designated as being mobile, should one exist. The host 102 may make this selection automatically, or may prompt the user to confirm that the custom domain name is for mobile content.

Once the entry is retrieved for the selected third party service, in step 404 host 102 analyzes the DNS templates stored in the entry. As described above in reference to Table 3, the DNS templates may include static entries as well as entries that contain variables. The static templates will generally set forth a type as well as a value for the template. Example static entries may have a type of 'A' and a value including an IP address (e.g., '123.123.123.123'), for example. Similarly, a static entry may have a type of 'CNAME' and a value of a domain name (e.g., 'domains.blogtool.com.').

For the records that are static, host 102 creates a DNS record (e.g., within DNS records 104) for each static record using the data from the entry and the user's desired custom domain name. If the template includes an IP address for the selected third party service, host 102 may create an A record within DNS records 104 that points the custom domain name to the IP address. Alternatively, if the template includes a domain name for the third party service, host 102 may create a CNAME record within DNS records 104 that points the custom domain name to the domain name for the third party service. In some embodiments, step 404 may involve host 102 modifying one or more customer records of the user so that DNS records 104 become the controlling DNS records for the user's domain name.

In some cases, however, the DNS templates may include entries that contain variables. This may be the case, for example, if the third party service requires an individual attempting to utilize a custom domain name with the third party service to enter a specific token or code into a DNS record as a means of authenticating that the user has the authorization to create the custom domain name link. These tokens may be strings of characters that must be entered into the DNS record or may include some information known to the user, such as their userid with the third party service. Before the variable templates can be instantiated as DNS records, the variables must be replaced by the suitable token for the user. For example, a variable record in a DNS template may specify a type of 'TEXT' and a value of "photoblog-{token}", where {token} denotes a variable that must be replaced by some security token. For example, the security token for a particular user may be 'XYZ567'. In that case, the variable template would be used in combination with the security token to create a DNS record of type TEXT and having a value of 'photoblog-XYZ567.

If the DNS templates include variables, corresponding DNS records cannot be generated in step 404 because the security tokens are unknown. As such, only DNS records for the static templates will be created in step 404.

In step 408, host 102 accesses the third party service to both setup the custom domain name mapping to the user's account and also, if any of the DNS templates for the third party service include variables, request the necessary security tokens. As mentioned above, the security tokens may include strings of characters or other information such as the user's account name or ID with the third party service.

Host 102 may use any suitable mechanism to access the third party service to both create custom domain name mappings as well as to retrieve security tokens. In one embodiment, host 102 relies upon access mechanisms that are delegated to the host 102 from the third party service, such as OAuth. Alternatively, host 102 may prompt the user for the user's security credentials (e.g., username and password) for the third party service. After the user provides the security credentials, host 102 can use those credentials to access the third party service to setup the custom domain name mapping to the user's account with the third party service in step 410. The third party service may also offer an application program interface (API) through which host 102 can create or modify a custom domain name map after supplying the appropriate security credentials and retrieve security tokens.

If the authentication process described herein should fail, the present system may be configured to display helpful 'next steps' to assist the user in completing the activity manually. These next steps may be stored in the custom domain name link database described above, as the manual 'next steps' may be different for each third party service.

In some other embodiments, however, rather than host 102 prompting the user for authentication credentials and then communicating directly with the third party service provider, step 408 includes host 102 simply providing the user with instructions on how to create the custom domain name mapping with the third party service manually.

In step 410, if any of the DNS templates for the third party service included variables, those variables can be replaced by the security token retrieved in step 408 and the corresponding DNS records can be created.

Once the custom domain name mapping has been created at the third party service to link the custom domain name with the user's account and the DNS records have been created, in step 412 the user can be notified that the custom domain name has been correctly setup for the third party service.

Figure 5:
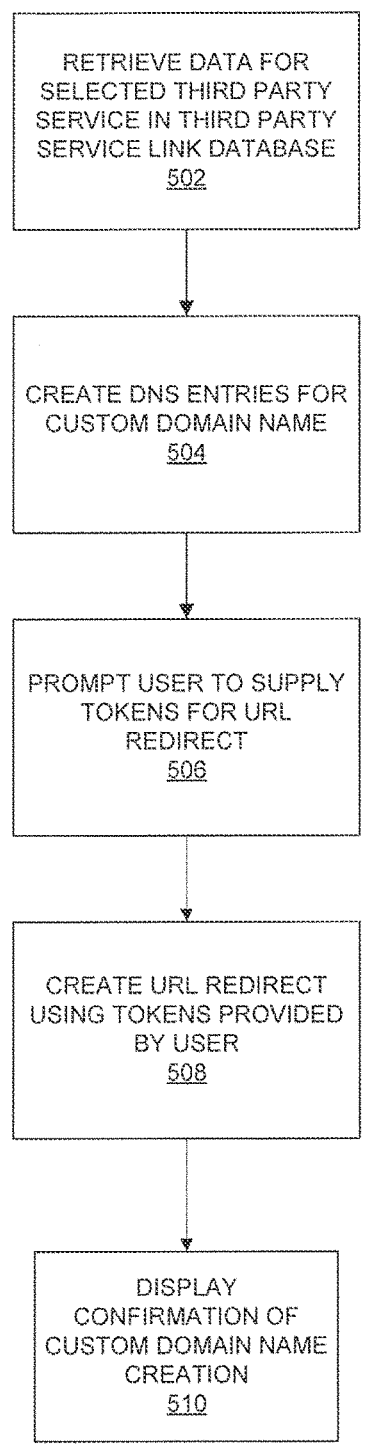
FIG. 5 is a flowchart depicting a method for creating a URL redirect-based custom domain name for a third party service.

If, however, the selected third party service requires URL redirects to implement custom domain names, host 102 may perform the method illustrated in FIG. 5 to create the user's desired custom domain name link.

In step 502, host 102 accesses the third party service link database to retrieve the entry for the selected third party service. In some cases, where there are multiple entries for the selected third party service, this will involve selecting the entry that is associated with a location that matches that of the user. In this optional step, the location of the user may be identified, for example, by examining the customer records of the user, or analyzing an IP address of the user to determine a location of the user's computer. Then, the entry for the selected third party service with a region that encompasses that of the user can be retrieved. In the event that no entry includes a region that encompasses the user, one of the entries for the selected third party service may be defined as a default entry to be utilized.

In some cases, the custom domain name provided by the user will at least partially determine which entry is retrieved for the selected third party service. For example, if the custom domain name entered by the user is 'mobile.photo-processing.com' or 'm.photoprocessing.com', the use of the terms 'mobile' or 'm' may indicate that the user wishes to use the custom domain name to display content suited for display on a mobile device. In that case, host 102 would retrieve the entry for the third party service that is designated as being mobile, should one exist. Host 102 may make this selection automatically, or may prompt the user to confirm that the custom domain name is for mobile content.

Once the entry is retrieved for the selected mobile service, in step 504 host 102 creates a DNS record (e.g., within DNS records 104). In this case, the DNS entry will point the custom domain name supplied by the user to a web server under the control of host 102 (e.g., web server 106).

Figure 6:
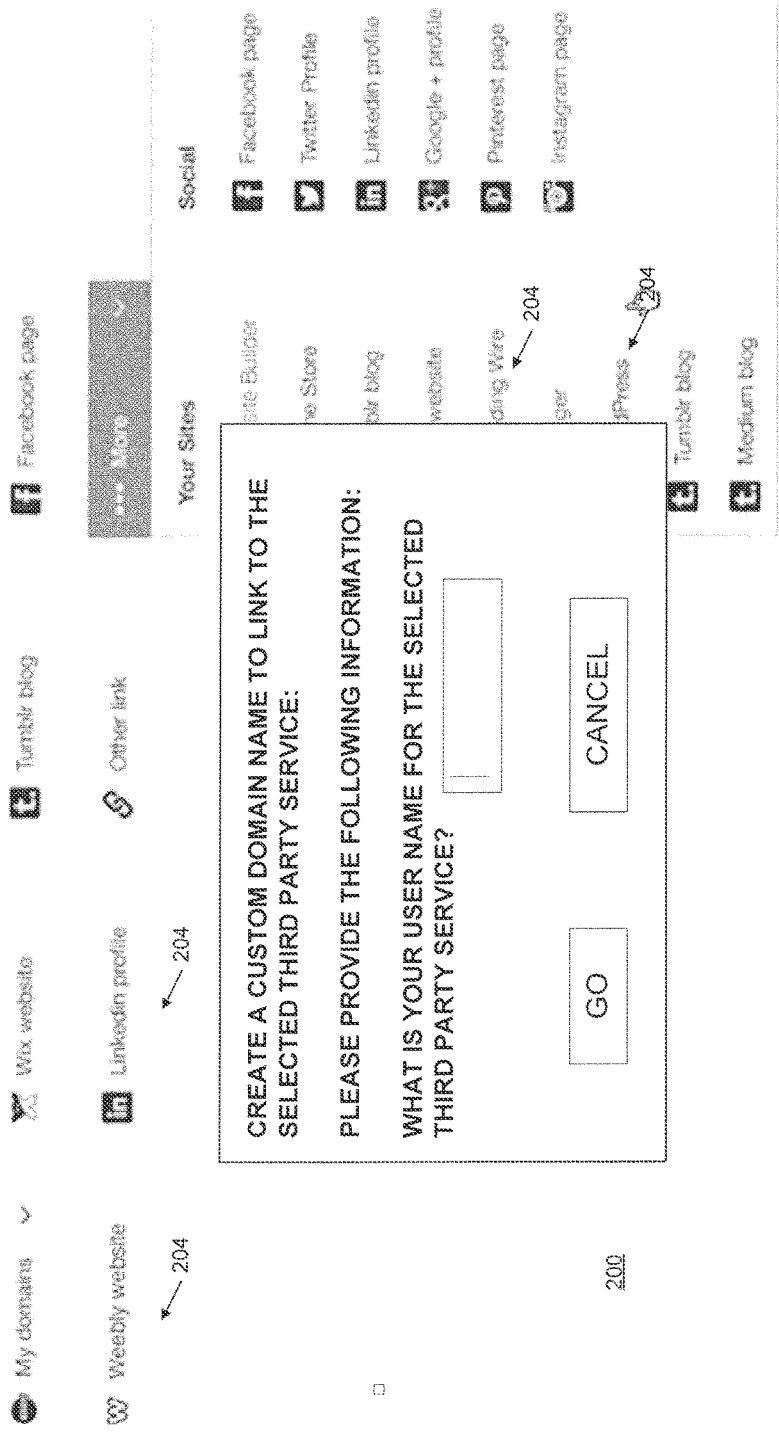
FIG. 6 is a screenshot showing an example user interface for prompting the user to supply the necessary tokens to create a URL redirect-based custom domain name.

With the DNS record created, in step 506 host 102 prompts the user to provide the one or more tokens necessary for the creation of the URL redirect. In many cases, this will be a single token that includes a user name or other user account identifier. FIG. 6 is a screenshot showing an example user interface for prompting the user to supply the necessary tokens to create a URL redirect.

Returning to FIG. 5, after the user has supplied the required tokens, in step 508 host 102 constructs a URL redirect using the supplied tokens and the Redirect URL Template retrieved from the third party service link database. This involves replacing the variables in the template with the tokens that were provided by the user. In an example, a URL redirect is being created for a third party service that has the URL Redirect Template of 'https://www.service.com/users/accounts/home/[account name]'. The user has provided an account name of 'photos_123'. In that case, the account name would be inserted into the URL Redirect Template so that the URL redirect becomes ' https://www.service.com/users/accounts/home/photos_123'.

Host 102 can then create the URL redirect and install the URL redirect on web server 106. This may involve, for example, modifying one or more .htaccess files within web server 106 or using another configuration mechanism to setup and implement the URL redirect. With the URL redirect installed on web server 106, the custom domain name has been created. Accordingly, in step 510, the user can be notified that the custom domain name has been correctly setup for the third party service.

In situations where the third party service provided email services, host 102 may be configured to retrieve MX and SPF records for the third party service from the third party service link database. Once received, those MX and SPF records may be utilized to automatically configure the third party service to host email services for the custom domain name.

In some embodiments, once the custom domain names have been implemented (e.g., using the method of either FIG. 4 or FIG. 5), host 102 may provide the user with a preview of the operation of the custom domain name (e.g., by popping up a browser window directed to the custom domain name) to provide the user with an opportunity to confirm the successful operation of the custom domain name. If the user is happy with the custom domain name's operation, the custom domain name (and the corresponding DNS, web server, and third party service settings) can be made permanent. Alternatively, if the user is not happy with the custom domain name's operation, the changes can be cancelled allowing the user to setup the custom domain name differently.

Once a custom domain name has been created for the user, the user will be able to access a configuration tool for their domain name's DNS settings and view the new entries that were created by host 102 to implement the custom domain name.

In the present system, the DNS entries that were created as a result of the creation of a custom domain name (e.g., via the performance of the methods of FIG. 4 or FIG. 5), may be locked so that they cannot be edited or revised by the user. This can provide at least two benefits. First, the DNS entries can be complicated—even relatively minor errors in the DNS records for a particular domain name could result in the domain name (and its sub-domains) not operating as desired. As such, the locking of those DNS entries prevents inadvertent errors being created, which may render the custom domain names inoperative. Second, although the domain name entries are locked to the user, they can still be edited by host 102. This allows host 102 to update the entries when changes are made the third party service link database. For example, if the IP address associated with a third party service changes in the third party service link database, host

102 can automatically update all DNS entries that have been created for users in DNS records 104 for that third party service.

Similarly, if a third party service switches from a URL redirect-based custom domain approach to a DNS-based approach, host 102 can automatically update the settings of users who have previously implemented URL redirect-based custom domain names for that third party service.

Figure 7:
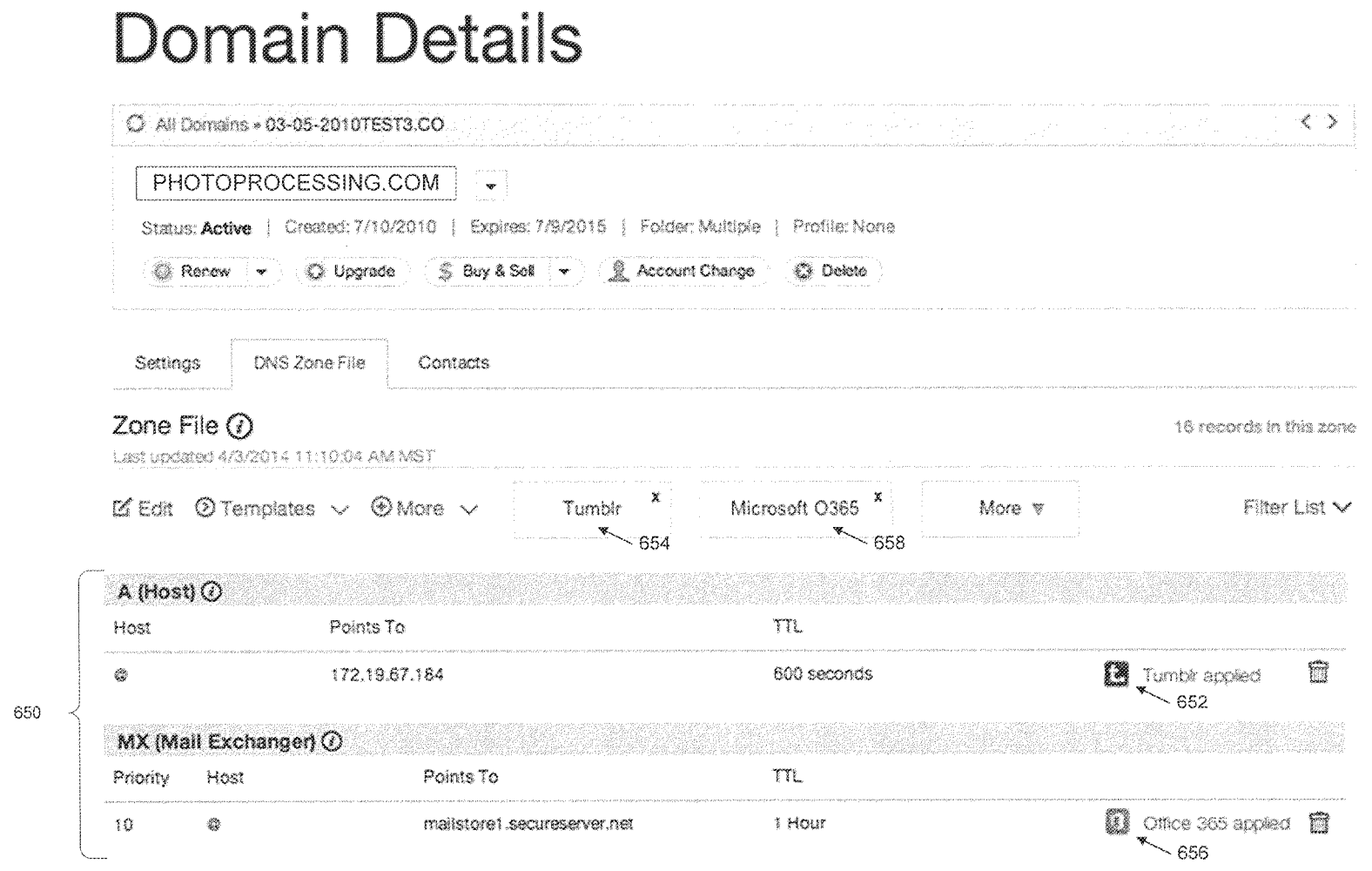

To illustrate, FIG. 7 is a screenshot showing an example control panel for the DNS records for a domain name in which a number of records are locked. Referring to FIG. 7, the DNS records for the domain name 'photo-processing.com' are presented. As illustrated the user interface includes a number of DNS records 650 for the domain name. The records in this example include an A record entry and an MX (mail) entry.

As indicated by icon 652, the A record has been created to implement a custom domain name link to the third party application TUMBLR. That record, then is locked and cannot be edited by the user. Instead, the user is only presented with the option to delete the custom domain name link using button 654. Similarly, as indicated by icon 656, the MX record and any other corresponding DNS records required to implement the email services have been created to implement a custom domain name link to the third party application OFFICE365. Thos records are then locked and cannot be edited by the user. Instead, the user is only presented with the option to delete the custom domain name link using button 658.

In the system described above, settings are stored in a third party service link database enabling the automatic (or semi-automatic) creation of custom domain names for a number of different third party services.

In some implementations, the user may want to create a custom domain name for a third party service for which the user cannot identify a specific button 204. In that case, the user may select the button 206 to create a custom domain name for a third party service of 'other'. Once the user has selected that button, they are presented with the user interface depicted in FIG. 8.

Figure 8:
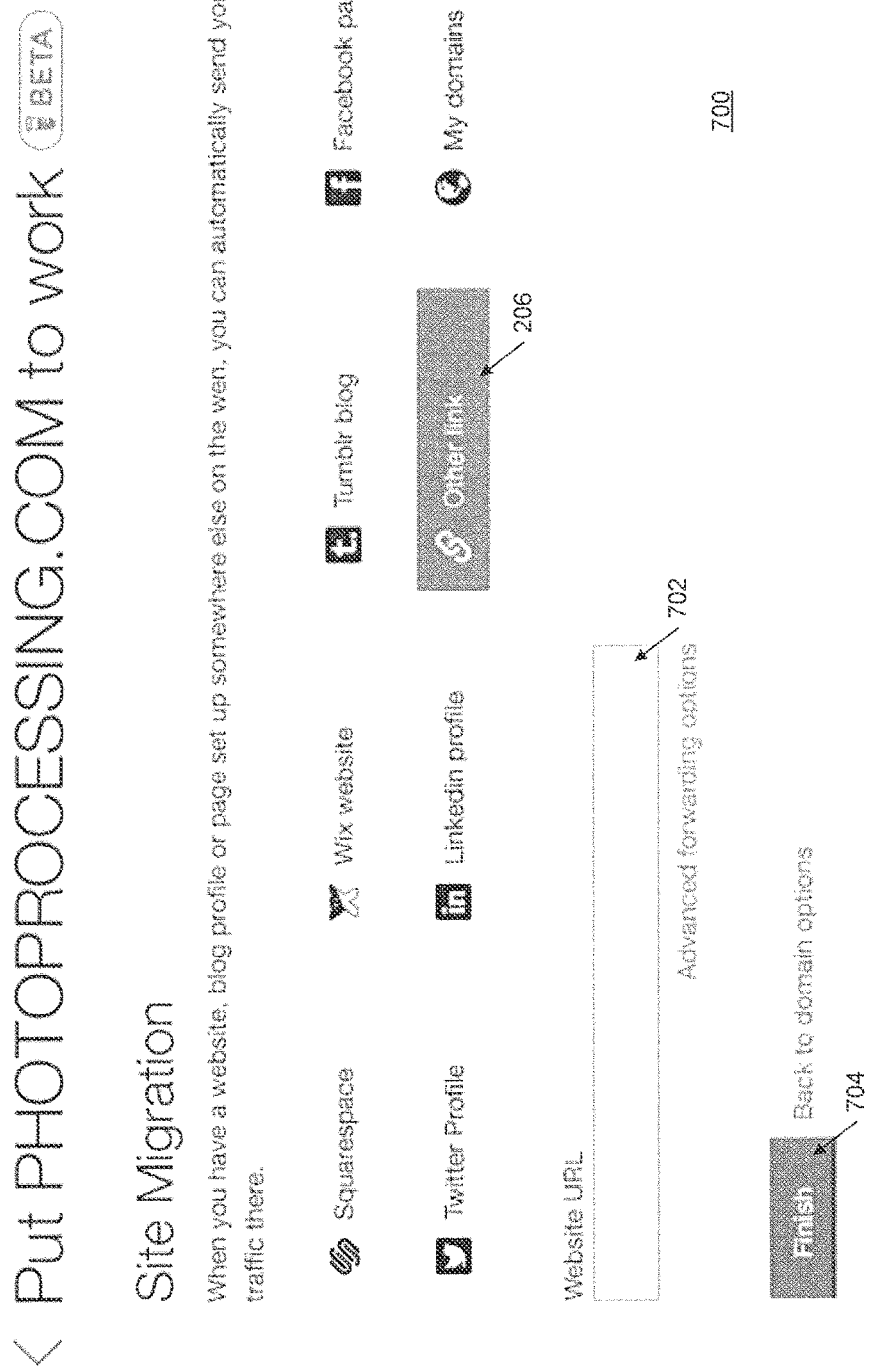
FIG. 8 is a screenshot showing an example user interface 700 enabling a user to create a custom domain name for a third party service.

FIG. 8 is a screenshot showing an example user interface 700 enabling a user to create a custom domain name for a third party service. After the user has selected the button for the 'other' third party service, the user is presented with a text box 702 allowing the user to paste a URL. The URL pasted into text box 702 will be a URL pointing to the third party service for which the user wishes to create a custom domain name.

Figure 9:
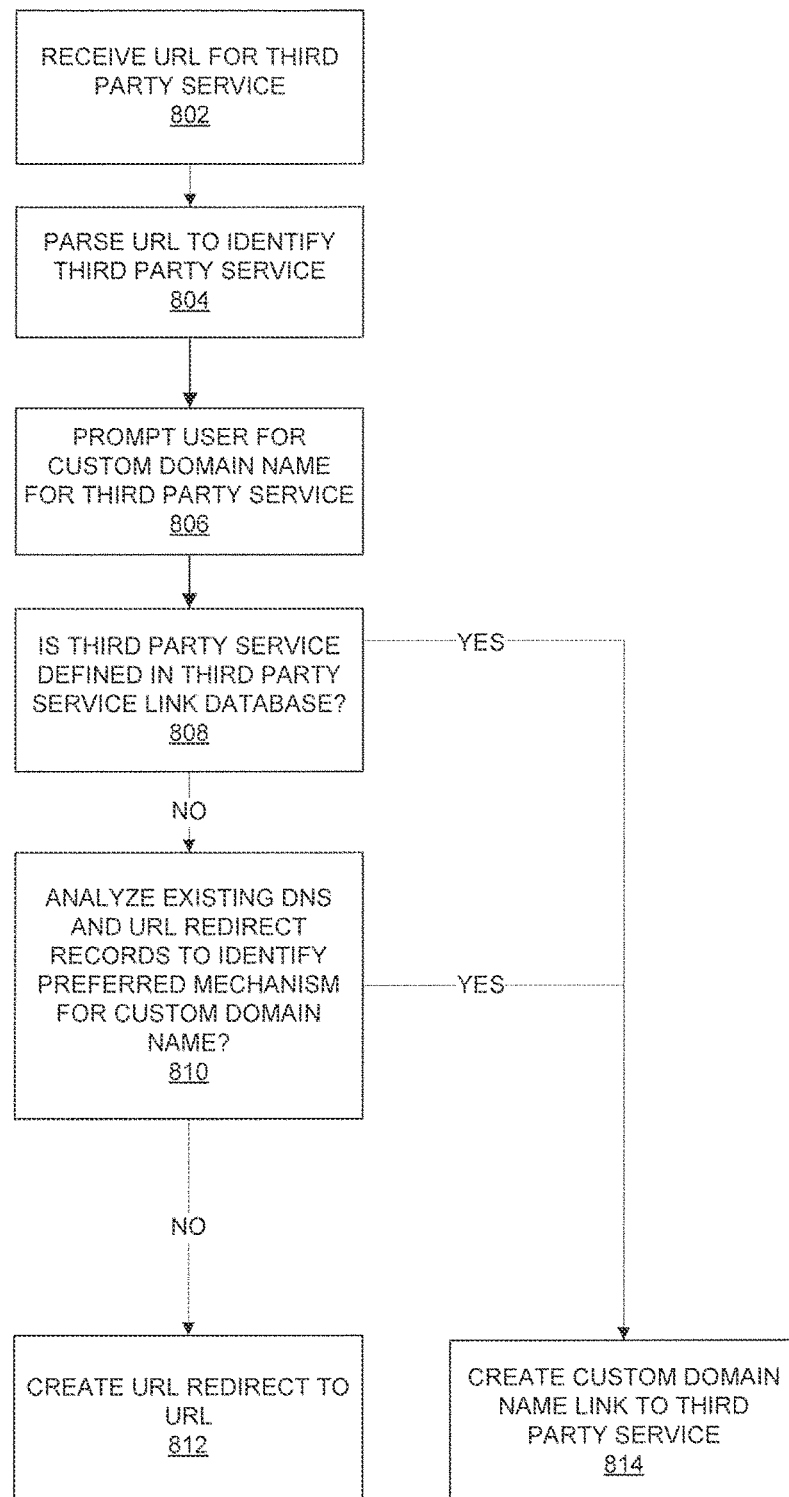
FIG. 9 is a flowchart depicting a method that may be performed by a host upon receiving a URL entered by the user to create a custom domain name for a third party service hosting the URL.

For example, if the user wishes to create a custom domain name to reference a particular website on a third party service (e.g., 'http://www.ebay.com/stores/samples), the user would paste that URL into text box 702. With the URL pasted into text box 702, the user can press the finish button 704 to submit the URL to host 102 and initiate the process of creating a custom domain name for the URL. FIG. 9 is a flowchart depicting a method that may be performed by host 102 upon receiving the URL entered by the user to create a custom domain name for the associated third party service.

Referring to FIG. 9, in step 802 the URL submitted by the user is received. In step 804, the URL can be parsed to identify the third party service. This involves identifying the SLD in the submitted URL, which will generally identify the third party service. In the present example URL of 'http://www.ebay.com/stores/samples', the third party service would be identified as 'ebay'. In this step, the URL is further parsed to identify any sub-domain that may be identified in the URL. In this example, the sub-domain is 'www', though other sub-domains such as 'mobile' or 'm' may be identified within the URL.

In step 806, the user is prompted to provide a custom domain name for the third party service. In some cases, the user may be provided with a blank form in which to enter the custom domain name (see, for example, form 302 on FIG. 3). In other cases, however, the custom domain name may be pre-populated based upon the parsing of the URL performed in step 804 or, alternatively, step 806 may be option and the user's domain name may be utilized directly as the custom domain name. The custom domain name, for example, may be pre-populated with the name of the service identified in step 804. In that case, in the present example the custom domain name suggested may be 'ebay.photo-processing.com'.

After the user has either provided the custom domain name or accepted the suggested custom domain name, in step 808 a search is performed to determine whether an entry is provided for the third party service in the third party service link database, described above. This determination may be made, by identifying whether one or more entries exist where the name defined in the third party service link database is equal to the name of the third party service identified in step 804.

If so, then the appropriate entry is selected and a custom domain name link is created accordingly in step 814. This may involve, for example, the execution of one of the methods shown in FIG. 4 and FIG. 5 and described above. In this step, if a sub-domain of 'mobile' or 'm' was identified in the URL, then a mobile entry for the third party service in the third party service link database would be used, if available.

If, however, an entry does not exist in the third party service link database for the third party service, in step 810, host 102 may be configured to analyze all available records in DNS records 104 and all URL redirects created on web server 106 in order to identify a preferred mechanism for creating custom domain names to the third party service. If, as a result of this analysis, host 102 determines that there are a large number of URL redirects pointing to the third party service, that may indicate that the third party service does not accept DNS-based custom domain names. In that case, the method may move to step 814 where a custom domain name link is created using a URL redirect that points the custom domain name provided by the user in step 806 to the URL received from the user in step 802.

Conversely, the analysis performed in step 810 may determine that there are a large number of DNS entries pointing to the third party service, with relatively few URL redirects pointing to the third party service. That may indicate that the third party service accepts DNS-based custom domain names. In that case, the method may move to step 814 where a DNS-based custom domain name is created and the user is prompted to access the third party service to create the appropriate custom domain name mapping.

Finally, in step 812, in no suitable mechanism has been identified for creating a custom domain name link to the third party service, a URL redirect may be create to point the custom domain name to the URL received in step 802.

Various embodiments of the present invention may be embodied in many different forms, including, but in no way limited to, computer program logic for use with a processor (e.g., a microprocessor, micro controller, digital signal processor, server computer, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as C, C++, or JAVA) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), a PC card (e.g., PCM-CIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or temporarily in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Some embodiments provided for are described as computer-implemented method claims. However, one of ordinary skill in the art would realize that the method steps may be embodied as computer code and the computer code could be placed on a tangible, non-transitory computer readable medium defining a computer program product.

Although the above discussion discloses various exemplary embodiments of the invention, it should be apparent that those skilled in the art can make various modifications that will achieve some of the advantages of the invention without departing from the true scope of the invention.

The invention claimed is:

1. A method, comprising:
   receiving, by at least one server communicatively coupled to a network, a request from a user to create a custom domain name link to a third party service, the request identifying a custom domain name and the third party service;
   accessing, by the at least one server, a third party service link database to identify an entry for the third party service specifying either a uniform resource locator (URL) redirect-based custom domain name link or a domain name system (DNS)-based custom domain name link, wherein the third party service link database identifies an Internet protocol (IP) address or a subdomain of the third party service;
   when the entry specifies the URL redirect-based custom domain name link for the third party service:
      creating, without further input from the user, a first DNS entry pointing the custom domain name to a web server accessible to the at least one server, and
      creating, on the web server, a URL redirect to redirect Internet traffic directed to the custom domain name to the third party service, including:

determining, using the request, a user account identifier; and including the user account identifier in the URL redirect on the web server, including accessing the third party service link database to identify a template for the URL redirect; and when the entry specifies the DNS-based custom domain name link for the third party service:

creating, without further input from the user, a second DNS entry pointing the custom domain name to the third party service, wherein creating the second DNS entry includes pointing the custom domain name to the IP address or subdomain of the third party service, and causing the third party service to create a custom domain name mapping that maps the custom domain name to a user account of the user by prompting the user to supply one or more authentication credentials for the third party service.

2. The method of claim 1, including accessing the third party service link database to determine whether to create the URL redirect as a 301 redirect or a 302 redirect.

3. The method of claim 1, wherein the request includes a URL, and including parsing the URL to identify the third party service.

4. A system, comprising:

a third party service link database storing, for each of a plurality of third party services, at least one entry specifying either a uniform resource locator (URL) redirect-based custom domain name link or a domain name system (DNS)-based custom domain name link; and a server hardware computing device coupled to a network and to the third party service link database, the server hardware computing device comprising a processor executing specific computer-executable instructions that when executed, cause the system to:

receive a request from a user to create a custom domain name link to a third party service within the plurality of third party services, the request identifying a custom domain name and the third party service;

access the third party service link database to identify an entry for the third party service, wherein the third party service link database identifies an Internet protocol (IP) address or a sub-domain of the third party service;

when the entry specifies the URL redirect-based custom domain name link for the third party service:

create, without further input from the user, a first DNS entry pointing the custom domain name to a web server accessible to the at least one server hardware computing device, and create, on the web server, a URL redirect to redirect Internet traffic directed to the custom domain name to the third party service including:

determining, using the request, a user account identifier; and including the user account identifier in the URL redirect on the web server, including accessing the third party service link database to identify a template for the URL redirect; and when the entry specifies the DNS-based custom domain name link for the third party service:

create, without further input from the user, a second DNS entry pointing the custom domain name to the third party service, wherein creating the second DNS entry includes pointing the custom domain name to the IP address or subdomain of the third party service, and create a custom domain name mapping that maps the custom domain name to a user account of the user by prompting the user to supply one or more authentication credentials for the third party service.

5. The system of claim 4, wherein the processor is configured to perform the step of accessing the third party service link database to determine whether to create the URL redirect as a 301 redirect or a 302 redirect.

* * * * *